Patented Nov. 9, 1937

2,098,431

UNITED STATES PATENT OFFICE 2,098,431

WATER TREATING COMPOSITION

Everett P. Partridge, Brookside Farms, Bethel Township, Pa., assignor to Hall Laboratories, Inc., Pittsburgh, Pa., a corporation of Pennsylvania No Drawing. Application October 31, 1936, Serial No. 108,639

6 Claims. (Cl. 210—23)

This invention relates generally to a water treating composition and method of making the same, and more particularly to a composition for treating steam boiler water.

The Hall and Jackson Patent No. 1,903,041 discloses a method of treating water for steam boilers in which an alkali-metal metaphosphate or pyrophosphate or the corresponding acids are added to the water in the boiler or to the water in the feed lines leading to the boiler in order to control the alkalinity of the water in the boiler and prevent the formation of adherent boiler scale. As disclosed in that patent, the alkali-metal metaphosphates or pyrophosphates or the corresponding acids, when subjected to water at boiler temperatures, are molecularly rehydrated into the orthophosphates and acids which have greater alkali-neutralizing capacity than the meta- or pyrophosphates or acids. In this manner, the alkalinity in the boiler is controlled without proportionately decreasing the alkalinity of the water in the feed lines. The formation of adherent boiler scale is also prevented or decreased.

In addition to treating the boiler water so as to regulate its alkalinity and prevent the formation of adherent scale, it is also advisable to remove dissolved oxygen from the water. Dissolved or free oxygen, if present in the boiler water, leads to corrosion of the boiler surfaces with which the water is in contact and also increases the tendency toward scale formation.

In accordance with the present invention, the removal of oxygen from boiler water is accomplished by combining finely divided metal with an alkali-metal metaphosphate or pyrophosphate or the corresponding acids and employing the composition so produced in the treatment of boiler water. Finely divided metal, such as zinc, iron, magnesium and aluminum, have the property of removing dissolved oxygen from water at boiler temperatures. For example, powdered zinc reacts readily with water at boiler temperatures, liberating atomic hydrogen. This atomic hydrogen reacts with dissolved oxygen present in the water to fix it as water. The water treating composition of the present invention is a molecularly dehydrated phosphate containing finely divided metal having the property of reacting with dissolved oxygen in water at boiler temperatures. By the term "molecularly dehydrated phosphate" is meant either the alkali-metal metaphosphate or pyrophosphate, or materials of intermediate composition sometimes referred to as "polyphosphates", or the corresponding acids, since in each case there is a rehydration and an atomic rearrangement of the atoms of the molecule when they are subjected to water at boiler temperatures. When such a molecularly dehydrated phosphate containing finely divided metal, such as zinc, iron, magnesium or aluminum, is added to boiler water, the alkalinity of the water in the boiler is controlled, the formation of adherent boiler scale is prevented by the phosphate, and dissolved oxygen in the water is removed due to the action of the finely divided metal, all of these reactions cooperating in order to produce the most desirable conditions in the boiler water. The phosphate keeps the finely divided metal dispersed in the water so that the composition may be added to the water in the boiler feed lines without clogging them.

The finely divided metal, for example zinc, may be combined with sodium metaphosphate or other molecularly dehydrated phosphate by adding the zinc to the metaphosphate after the metaphosphate has been fused and allowed to cool to a viscous condition, and thereafter rapidly cooling the mass by pouring it onto chilled rolls. If the zinc or other metal is added to the molten metaphosphate before the metaphosphate has been cooled to a viscous condition, there is danger of the zinc burning and reducing the metaphosphate at the same time. Where, however, the zinc is added to the metaphosphate when the latter has been cooled to a viscous condition, the reaction, if any, between the zinc and the metaphosphate is only slight and unobjectionable. The zinc or other finely divided metal may be sprinkled upon the surface of the viscous sodium metaphosphate or other molecularly dehydrated phosphate and the mass immediately poured onto chilling rolls or wheels so as to rapidly cool the product and form it into powder or flakes. In this manner, a produce is obtained in which the molecularly dehydrated phosphate has the finely powdered metal disseminated therethrough or coated thereon. If desired, the zinc or other finely powdered metal may be introduced between two streams of the viscous phosphate just before they contact with the chilling rolls. In this way a product is produced in which the finely divided metal is embedded within the powder or flakes of metaphosphate.

The molecularly dehydrated phosphate containing zinc is useful not only in the removal of dissolved oxygen, but also serves the purpose of removing silica which sometimes is objectionable.

The molecularly dehydrated phosphate which

I prefer to use in combination with finely powdered metals is the soluble sodium metaphosphate sometimes called "Graham's salt" (Textbook of Inorganic Chemistry, edited by J. Newton Friend, vol. 6, part 2, page 177, by J. B. R. Prideaux, Philadelphia, 1934; Gmelin, Handbuch der Anorganischen Chemie, vol. 21, page 922, 8th Edition, Berlin, 1928); or "Graham's metaphosphate" (A Dictionary of Chemistry, by Henry Watts, vol. 4, page 578, New York, 1873; A Treatise on Chemistry, by Roscoe & Schorlemmer, vol. 2, part 1, page 233; New York, 1923). Graham's metaphosphate or salt is believed to consist principally of sodium hexametaphosphate. This material has the property of sequestering calcium and magnesium in a soluble and but slightly ionized form, so that when it is added to hard water containing calcium or magnesium, it prevents the formation of insoluble calcium or magnesium salts or soaps. The use of my product is not limited to boiler water application, but may be used wherever a water softening action combined with the removal of oxygen or silica is desired.

Although I have described a preferred embodiment of my invention and the preferred manner of practicing the invention, it will be understood that it is not limited thereto, but may be otherwise embodied within the scope of the following claims.

I claim:

1. A water treating composition comprising a molecularly dehydrated phosphate containing finely divided metal which reacts with dissolved oxygen in water at boiler temperatures.

2. A water treating composition comprising a molecularly dehydrated phosphate containing finely divided metal of the class consisting of zinc, iron, magnesium and aluminum.

3. A water treating composition comprising a molecularly dehydrated phosphate containing finely divided zinc.

4. A water treating composition comprising an alkali-metal metaphosphate containing finely divided metal which reacts with dissolved oxygen in water at boiler temperatures.

5. A water treating composition comprising an alkali-metal metaphosphate containing finely divided zinc.

6. A water treating composition comprising Graham's salt and finely divided metal which reacts with dissolved oxygen in water at boiler temperatures.

EVERETT P. PARTRIDGE.